United States Patent

Fujihara

[11] Patent Number: 5,530,479
[45] Date of Patent: Jun. 25, 1996

[54] METHOD OF COMPRESSION-CODING A MOTION PICTURE AND AN APPARATUS FOR SAME

[75] Inventor: Shiro Fujihara, Tokyo, Japan

[73] Assignee: NEC Corporation, Tokyo, Japan

[21] Appl. No.: 339,696

[22] Filed: Nov. 14, 1994

[30] Foreign Application Priority Data

Nov. 25, 1993 [JP] Japan ................................. 5-294990

[51] Int. Cl.$^6$ ................................................. H04N 7/30
[52] U.S. Cl. ........................................... 348/405; 348/384
[58] Field of Search ............................ 348/27, 384, 390, 348/400, 403–405, 407, 409, 412, 415; H04N 7/130, 7/133

[56] References Cited

U.S. PATENT DOCUMENTS

| | | | |
|---|---|---|---|
| 5,073,820 | 12/1991 | Nakagawa et al. | 348/405 |
| 5,073,821 | 12/1991 | Juri | 348/405 |
| 5,291,282 | 3/1994 | Nakagawa et al. | 348/384 |
| 5,335,016 | 8/1994 | Nakagawa | 348/405 |
| 5,389,973 | 2/1995 | Kitamura et al. | 348/405 |

FOREIGN PATENT DOCUMENTS 62-85588    4/1987   Japan .

*Primary Examiner*—Thai Q. Tran
*Assistant Examiner*—Richard Lee

*Attorney, Agent, or Firm*—Sughrue, Mion, Zinn, Macpeak & Seas

[57] ABSTRACT

A method and an apparatus for compression-coding of thinned-out motion picture frame are described. A received motion picture data is subject to DCT (discrete cosine transformation). The DCT coefficients are stored in a frame memory, and also accumulated over a frame of the received motion picture concerned. The accumulated value is used as a predicted code amount of the received frame concerned. The DCT coefficients stored in the frame memory are read and quantized two times. A first quantization step for the first quantization is selected based on a reference code amount, the accumulated value and the final code amount (described below) of the motion picture frame received immediately before the frame concerned. After the first quantization, the quantized DCT coefficients are variable-length-coded to produce a first series of codes of a first code amount. A coarse quantization step is selected as a second quantization step for second quantization when the first code amount is larger than the reference code amount, and when the first code amount is vice versa, a fine quantization step is selected. The DCT coefficients read for the second time are quantized according to the second quantization step, variable-length-coded to produce a second series of codes of a second code amount. Of the two code amounts, the code amount closer to the reference code amount is determined as a final code amount and the series of codes having the final code amount is outputted as variable-length-codes of the motion picture frame concerned.

5 Claims, 3 Drawing Sheets

METHOD OF COMPRESSION-CODING A MOTION PICTURE AND AN APPARATUS FOR SAME

BACKGROUND OF THE INVENTION

1. Field of the Invention

The present invention relates to a method of compression-coding a motion picture signal, and in particular to a method of compression-coding a motion picture signal that has undergone frame thinning. The present invention also relates to an apparatus for carrying out the above-described method.

2. Description of the Related Art

As can be seen in FIG. 1, in the prior art of motion picture compression-coding, the motion picture data is subject to orthogonal transformation at a discrete-cosine-transformer (hereinafter referred to as a DCT) 100, the output of which, i.e., a group of transformation coefficients, is quantized by a quantizer 200. The quantized picture data is variable-length-coded by a variable length coder 300, and the variable-length-coded picture data is stored in a buffer memory 400 for matching transmission speed with the transmission line. In this procedure, a quantization controller 500 carries out optimal quantization control through calculation based on an amount of codes in the immediately preceding frame and a reference amount of the codes predetermined as a desired code amount of one frame.

In this prior art, changes in content of a received picture causes changes in generated picture information. In particular, when rapid changes occur in the picture content, prominent variation occurs in the picture quality of the frames before and after the change.

For example, suppose that the picture content changes to a large extent between the frames of frame number n and frame number (n+1), particularly to the extent that the picture of frame (n+1) have many high spatial frequency components as to cause the code amount to exceed the reference code amount. In this case, a rough or coarse quantization step will be applied to the next frame (n+2), resulting in the code amount of the frame (n+2) prominently to decrease. As a result, a fine quantization step is applied to the frame (n+3), resulting in the picture quality abruptly improved. This phenomenon occurs in the same manner even if there is no change in picture content between the frames of frame number (n+1) and frame number (n+2), once a rapid change takes place at a frame (n+1). Such a phenomenon that picture quality changes even though there is no change in picture content, presents an even more unnatural impression to viewers than a picture of consistently poor quality.

Japanese Patent Laid-open No. 87-85588 discloses a method for solving the same type of problem occurring in an interframe coding method according to which changes in picture content between successive two frames are evaluated, and when these changes are judged to be great, the dynamic range of the quantizer for transformation coefficients is limited narrow, following which the dynamic range is gradually increased to return to a predetermined original breadth. Although abrupt changes in picture quality can be prevented by this method, there remains the problem that significant time is required for the picture quality to restore the level corresponding to the reference code amount.

In the art of coding motion pictures, a technique known as frame thinning is often employed by which the amount of information to be transmitted is reduced by coding motion picture signals for every other frame and, on the receiving side, replaying the coded frames twice. However, when application of the above-described quantization control is attempted for frame-thinned motion picture signals, quantization control is executed based on the code amount generated in the preceding thinned frame, i.e., the frame two frames earlier, thereby exacerbating the above-described problem.

SUMMARY OF THE INVENTION

The object of the present invention is to provide a motion picture compression-coding method that can solve the problem of fluctuations in picture quality despite the absence of changes in the picture content of a motion picture signal that has undergone frame thinning.

To achieve this object, the motion picture compression-coding method of the present invention comprises steps of:

receiving a motion picture frame that has been submitted to a frame-thinning process;

setting a first quantization step based on a final code amount of a preceding motion picture frame received immediately before said motion picture frame, a predicted code amount for said motion picture frame, and a reference code amount, such that deviation of a first code amount with respect to said reference code amount is minimized;

carrying out a first quantization of picture information of said motion picture frame according to said first quantization step, and variable-length-coding the quantized picture information to generate a first series of variable length codes;

calculating the code amount of said first series and determining the result of this calculation as a first code amount for said motion picture frame;

determining a second quantization step to be coarser than the first quantization step when the first code amount is larger than the reference code amount, and to be finer than the first quantization step when the first code amount is smaller then the reference code amount;

carrying out a second quantization of picture information for said motion picture frame according to said second quantization step, and variable-length-coding the quantized picture information to generate a second series of variable length codes;

calculating the code amount of said second series, and determining the calculation result as a second code amount for said motion picture frame; and comparing each of said first and second code amounts with said reference code amount, determining the code amount closer to said reference code amount as a final code amount, and supplying the series of variable length codes having said final code amount to an external circuit as compression data.

In this way, since the present invention is capable of selecting one of the two series of variable length codes having a code amount closer to a reference code amount prescribed suitably for coding a motion picture frame by taking advantage of the free time generated due to frame thinning, the previously described viewing distractions caused by changes in picture quality that occur despite absence of change in picture content can be reduced.

The motion picture compression-coding apparatus of the present invention for effecting the above-described method comprises:

orthogonal transformation means for orthogonally transforming an input motion picture frame that has been submitted to a frame-thinning process;

frame memory means for storing a series of transformation coefficients of the orthogonally transformed motion picture frame and outputting the series of transformation coefficients of the motion picture frame repeatedly twice over two successive frame periods;

quantizing means for receiving the series of transformation coefficients of the motion picture frame read from said frame memory means and also receiving first and second quantization control signals designating first and second quantization steps, respectively, and quantizing said series of transformation coefficients in accordance with the first and second quantization steps corresponding to the first and second quantization control signals, respectively;

variable length coding means for variable-length-coding the series of transformation coefficients quantized in accordance with said first and second quantization steps to generate first and second series of codes, and further computing code amounts of said first and second series of codes to generate first and second code amounts, respectively;

adding means for accumulating absolute values of alternating current components of said series of transformation coefficients of said motion picture frame to generate an alternating current component sum; and quantization control means for executing first and second quantization controls for the same motion picture frame based on said alternating current component sum, said first and second code amounts and said reference code amount supplied from an external circuit, said quantization control means, in a first quantization control, generating a first quantization control signal from said alternating current component sum of the motion picture frame concerned, a final code amount of a preceding motion picture frame received immediately before the motion picture frame concerned and the reference code amount, and delivering said first quantization control signal to said quantization means; said quantization control means, in a second quantization control, comparing said first code amount of said motion picture frame concerned with said reference code amount, generating a second quantization control signal such that, when the first code amount is larger than the reference code amount, a coarser quantization step than the first quantization step is generated and, when the first code amount is smaller than the reference code amount, a finer quantization step than the first quantization step is generated, and outputting said second quantization control signal to said quantizing means; comparing with the reference code amount each of said first code amount of said motion picture frame concerned and a second code amount corresponding to the second quantization control signal of the motion picture frame concerned; determining, as a final code amount, the code amount that is closer to said reference code amount; and outputting an output command signal for sending the series of codes having said final code amount to an external circuit as compression data; wherein if the frame period in which said motion picture frame concerned is received is denoted as a first frame period, the frame period of the thinned-out frame which follows said first frame period is denoted as a second frame period, and the frame period of a motion picture frame which follows said second frame period is denoted as a third frame period, accumulation of absolute values of alternating current components of transformation coefficients of a motion picture frame received in said first frame period is executed in said first frame period; and, transformation coefficients of the same motion picture frame being read two times from said frame memory means, the first reading as well as the quantization and variable length coding corresponding to the first quantization control signal, of the transformation coefficients read through the first reading are executed during said second frame period; and the second reading as well as the quantization and variable length coding corresponding to the second quantization control signal, of the transformation coefficients read through the second reading are executed during said third frame period.

The above and other objects, features, and advantages of the present invention will become apparent from the following description referring to the accompanying drawings which illustrate an example of a preferred embodiment of the present invention.

DETAILED DESCRIPTION OF THE PREFERRED EMBODIMENTS

An embodiment of the present invention will be explained in detail with reference to FIGS. 2 and 3.

Figure 1:
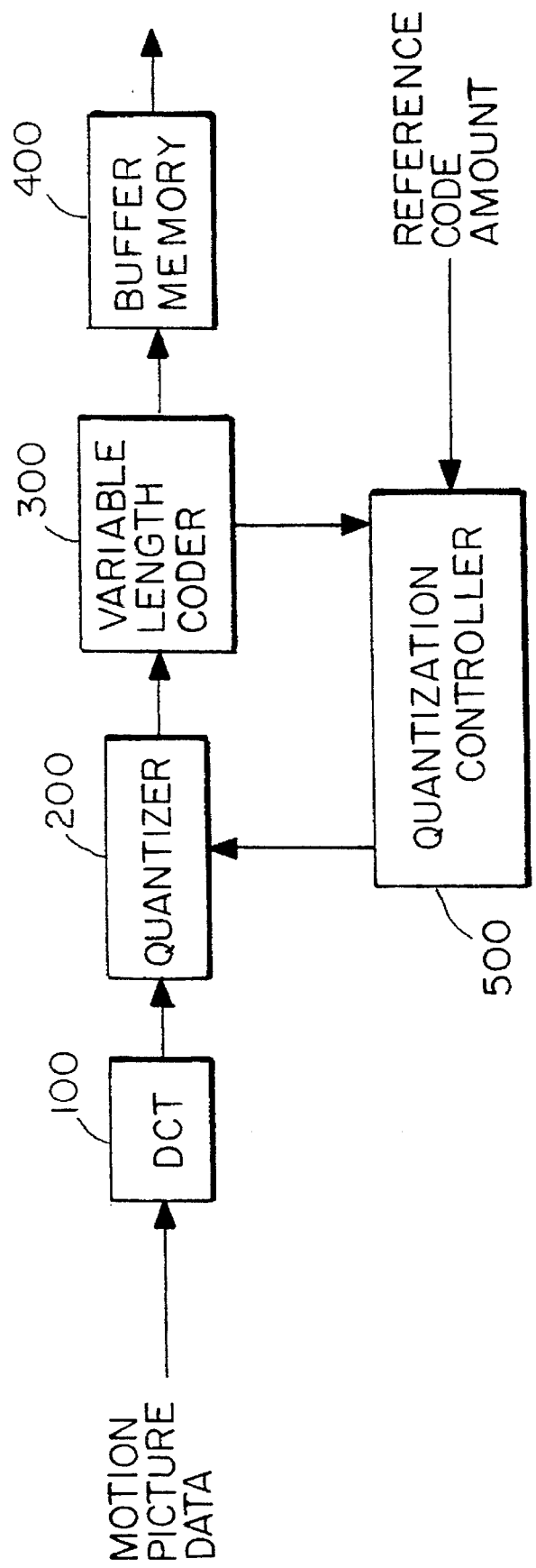
FIG. 1 illustrates the motion picture compression-coding method of the prior art.
Figure 2:
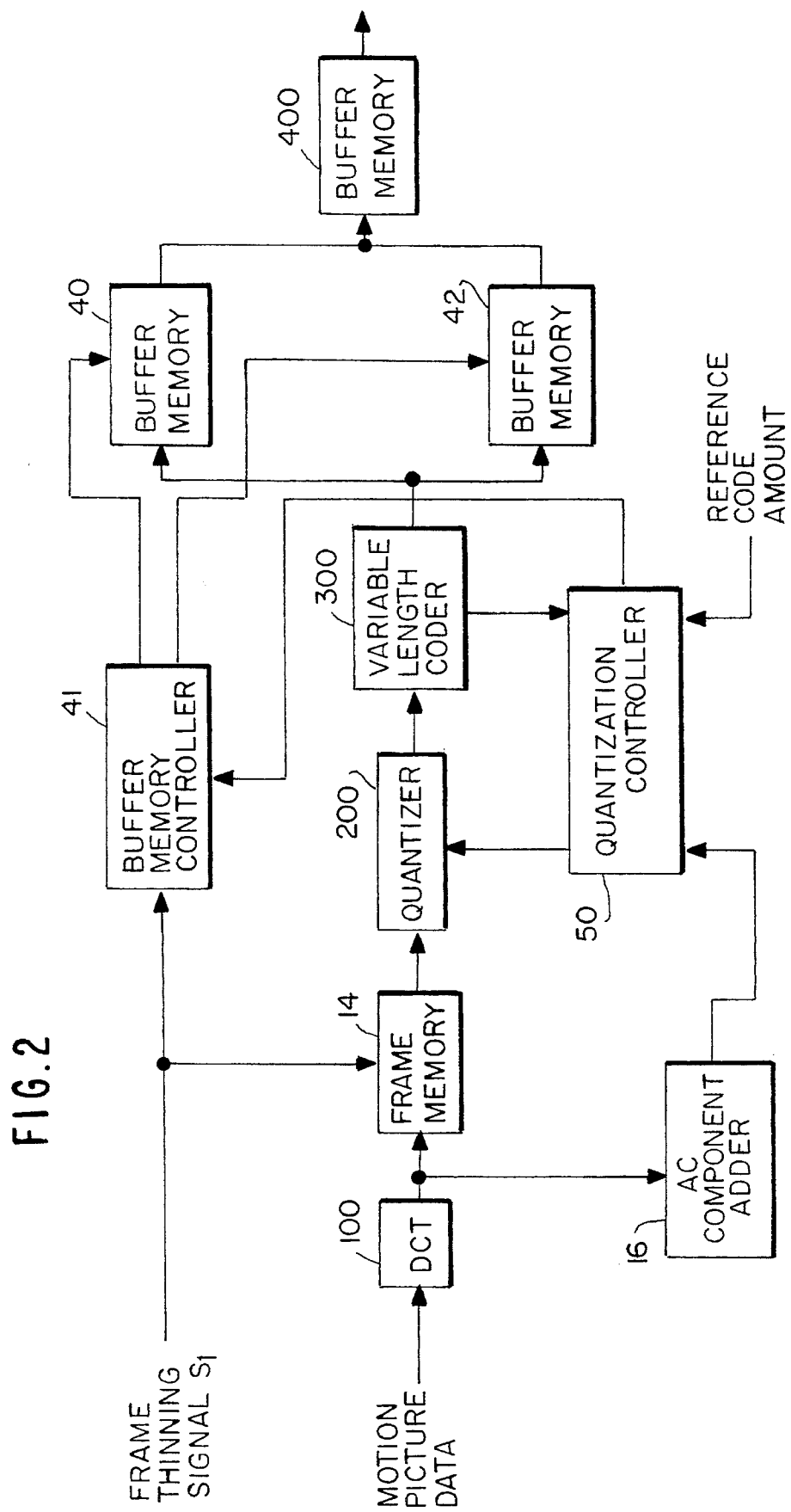
FIG. 2 is a block diagram showing an embodiment of the present invention.

FIG. 2 is a block diagram of an embodiment of the present invention. Discrete cosine transformer (DCT) 100 receives motion picture data, transforms the motion picture data to Fourier discrete cosine series, and outputs the resultant discrete cosine transformation coefficients (DCT coefficients). The DCT coefficients includes more components of high spatial-frequencies as the content of the picture to be coded has a finer spatial structure, and conversely, less components of high spatial-frequencies if the picture has a coarse or slowly varying structure. The DCT coefficients outputted by the DCT 100 is written to a frame memory 14. The writing of the DCT coefficients is performed for every other frame, for example, for only odd-numbered frames, in response to a frame thinning signal $S_1$. The written DCT coefficients are read out repeatedly twice for the same frame over two frame periods. Further, the DCT coefficients generated by DCT 100 are also supplied to the alternating current (AC) component adder 16.

The AC component adder 16 accumulates the absolute values of the AC components of the DCT coefficients over the frame concerned, i.e., the currently receiving, for example, odd-numbered frame. After the accumulation over one frame has been completed, the accumulated value is sent to the quantization controller 50. This accumulated value will hereinafter be referred to as the AC component sum. A frame having a large AC component sum has generally a large code amount. Accordingly, as will be described hereinbelow, the AC component sum will be used as a qualitative predicted value of the first code amount in the present embodiment. This predicted value will hereinafter be referred to as the predicted code amount.

The quantization controller 50 is provided with a table produced based on an established empirical law regarding a quantization step necessary for minimizing the deviation of the first code amount (to be explained) with respect to the reference code amount, as a function of the AC component sum, the reference code amount and the final code amount (to be explained) of the preceding motion picture frame received immediately before (the motion picture frame two frames earlier than) the frame concerned; generates from the table a first quantization control signal that will cause the optimum quantization and controls quantization carried out by the quantizer 200.

A plurality of quantization steps are stored in the quantizer 200 of the present embodiment, and these quantization steps are ordered in terms of the degree of roughness or coarseness of a quantization width such that the higher the rank, the rougher the step. The quantization controller designates this rank to the quantizer 200 by means of the first quantization control signal. In accordance with the quantization step corresponding to this rank, the quantizer 200 quantizes the DCT coefficients through an operation executed on the DCT coefficients read from the frame memory 14.

The quantized DCT coefficients are coded to variable length codes at the variable length coder 300, and it is then temporarily stored in the buffer memory 40 under control of the buffer memory controller 41.

Figure 3:
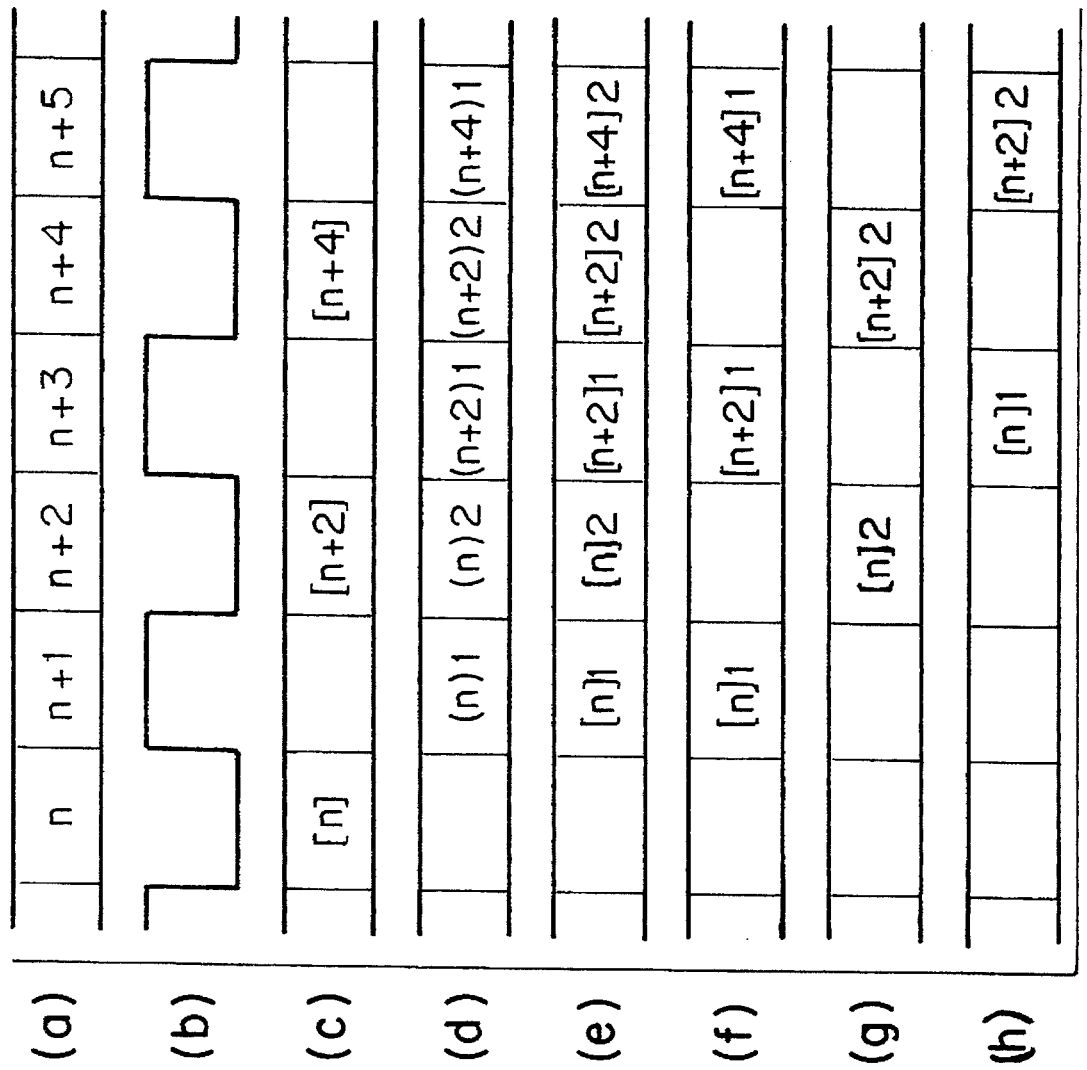
FIG. 3 is a block diagram showing the operation of the embodiment of the present invention shown in FIG. 2.

FIG. 3 is a time chart illustrating the operation of an embodiment of the present invention. FIG. 3(a) shows the reception period of the motion picture frame and n represents the frame period in which the motion picture frame of frame number n is received. FIG. 3(b) shows the frame thinning signal, wherein the period of motion picture thinning is the period during which the frame thinning signal is at a high level. FIG. 3(c) shows the accumulated value of the AC components calculated by the AC component adder. The AC components are accumulated at frame period n, n+2, n+4, and at the end of each frame period, the accumulation result, which is the AC component sum, is supplied to the quantization controller 50. FIG. 3(d) shows the output period of the DCT coefficients of each frame from the frame memory 14, and $(n)_1$ and $(n)_2$ represent the first and second reading-out periods, respectively, of the DCT coefficients of the motion picture frame n that has been received in every other frame period n and stored in the frame memory 14.

When the quantization controller 50 receives the AC component sum of the motion picture frame n from the AC component adder 16, it generates a first quantization control signal referring to a table established in dependence on the AC component sum (predicted code amount), the final code amount of the preceding motion picture frame (which is (n−2) in terms of the frame number), and the reference code amount supplied from the outside so that an optimum possible first quantization step is created in the quantizer 200, and further, through this quantization control signal, controls the quantizer 200 to quantize the DCT coefficients $((n)_1$ in FIG. 3(d)) supplied in the frame period shown in FIG. 2(d) (hereinafter referred to as the first quantization). The quantized DCT coefficient is converted into a series of variable length codes ($[n]_1$ in FIG. 3(e)) by the variable length coder 300. Hereinafter, this series of the variable length codes will be referred to as a first series of codes. Further, the code amount of this first series of codes is calculated by means of the variable length coder 300, and sent from the variable length coder 300 to the quantization controller 50. The first series of codes is also written to the first buffer memory 40 under the control of buffer memory controller 41 in the frame period shown in FIG. 3(f). The above described operation is carried out in frame period (n+1) by quantization controller 50, quantizer 200, variable length coder 300 and buffer memory 40.

Next will be explained the operation of the quantization controller 50, quantizer 200, variable length coder 300 and buffer memory 42 in the frame period (n+2). First, the quantization controller 50 compares with the reference code amount the code amount of the first series of codes (hereinafter referred to as the first code amount) which has produced in the frame period (n+1) by the variable length coder 300, and if the first code amount is larger than the reference code amount, designates to the quantizer 200 a quantization step that is more rough than, i.e., a quantization step that is one rank above, the quantization step designated to the quantizer 200 at the time of the first quantization. On the other hand, if the first code amount is found to be less than the reference code amount, the controller designates a quantization step finer than, i.e., a quantization step one rank below, the quantization step designated in the first quantization. In accordance with this designation, the quantizer 200 quantizes the DCT coefficients ($(n)_2$ in FIG. 3(d)) of frame number n read for the second time from the frame memory 200. This quantized DCT coefficients are converted into a second series of variable length codes ($[n]_2$ in FIG. 2(e)) at the variable length coder 300. The second series of codes is written to buffer memory 42 under the control of the buffer memory controller 41 ($[n]_2$ in FIG. 3(g)). Further, the code amount of the second series of codes (hereinafter referred to as the second code amount) is sent from the variable length coder 300 to the quantization controller 50.

After the above-described processings are completed, the quantization controller 50 determines which of the first code amount and the second code amount is closer to the reference code amount: If the first code amount is closer to the reference code amount, the quantization controller 50 outputs to the buffer memory controller 41 an output command signal to write the first series of codes stored in buffer memory 40 to buffer memory 400 for matching the transmission speed of the apparatus with the transmission line. Accordingly, the first code amount becomes the final code amount in this case. Conversely, if the second code amount is closer to the reference code amount, the quantization controller 50 generates an output command signal to write the second series of codes stored in buffer memory 42 to buffer memory 400. Accordingly, in this case, the second code amount becomes the final code amount.

In FIG. 3(h), the first code amount for the picture of frame number n is closer to the reference code amount, while for frame number (n+2), the second code amount is closer to the reference code amount. For this reason, the first series of codes $[n]_1$ is written to buffer memory 400 for the picture of frame number n, while the second series of codes $[n+2]_2$ is written to memory 400 for the picture of frame number (n+2).

The content written to the buffer memory 400 is read out at a fixed speed and delivered to the transmission line or recording medium.

As explained hereinabove, since the present invention is capable of selecting one of the two series of codes having a code amount closer to a reference code amount prescribed suitably for coding a motion picture frame by taking advantage of the free time generated due to frame thinning, the previously described viewing distractions caused by changes in picture quality that occur despite absence of change in picture content can be reduced.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A motion picture compression-coding method comprising steps of receiving a motion picture frame that has been submitted to a frame-thinning process;

setting a first quantization step based on a final code amount of a preceding motion picture frame received immediately before said motion picture frame, a predicted code amount for said motion picture frame, and a reference code amount, such that deviation of a first code amount with respect to said reference code amount is minimized;

carrying out a first quantization of picture information of said motion picture frame according to said first quantization step, and variable-length-coding the first quantized picture information to generate a first series of variable length codes;

calculating the code amount of said first series and determining the result of this calculation as the first code amount for said motion picture frame;

determining a second quantization step to be coarser than the first quantization step when the first code amount is larger than the reference code amount, and to be finer than the first quantization step when the first code amount is smaller then the reference code amount;

carrying out a second quantization of picture information for said motion picture frame according to said second quantization step, and variable-length-coding the second quantized picture information to generate a second series of variable length codes;

calculating the code amount of said second series, and determining the calculation result as a second code amount for said motion picture frame; and comparing each of said first and second code amounts with said reference code amount, determining the code amount closer to said reference code amount as a final code amount, and supplying the series of variable length codes having said final code amount to an external circuit as compression data.

2. The method according to claim 1 wherein said step of carrying out the first-quantization includes a step of executing orthogonal transformation of a picture of said motion picture frame and determining a series of the resulting transformation coefficients as picture information of said motion picture frame, and said step of setting the first quantization step includes a step of accumulating absolute values of alternating current components of said series of transformation coefficients and determining the accumulated value as the predicted code amount for said motion picture frame.

3. The method according to claim 2 wherein said step of setting the first quantization step includes a step of determining the first quantization step in accordance with an empirical law established concerning a quantization step necessary for minimizing deviation of said first code amount with respect to said reference code amount as a function of said reference code amount, a final code amount of a motion picture frame received immediately before said motion picture frame, and the predicted code amount of said motion picture frame.

4. A motion picture compression-coding apparatus comprising:

orthogonal transformation means for orthogonally transforming an input motion picture frame that has been submitted to a frame-thinning process;

frame memory means for storing a series of transformation coefficients of the orthogonally transformed motion picture frame and outputting the series of transformation coefficients of the motion picture frame repeatedly twice over two successive frame periods;

quantizing means for receiving the series of transformation coefficients of the motion picture frame read from said frame memory means and also receiving first and second quantization control signals designating first and second quantization steps, respectively, and quantizing said series of transformation coefficients in accordance with the first and second quantization steps corresponding to the first and second quantization control signals, respectively;

variable length coding means for variable-length-coding the series of transformation coefficients quantized in accordance with said first and second quantization steps to generate first and second series of codes, and further computing code amounts of said first and second series of codes to generate first and second code amounts, respectively;

adding means for accumulating absolute values of alternating current components of said series of transformation coefficients of said motion picture frame to generate an alternating current component sum; and quantization control means for executing first and second quantization controls for the same motion picture frame based on said alternating current component sum, said first and second code amounts and a reference code amount supplied from an external circuit, said quantization control means, in a first quantization control, generating the first quantization control signal from said alternating current component sum of the motion picture frame concerned, a final code amount of a preceding motion picture frame received immediately before the motion picture frame concerned and the reference code amount, and delivering said first quantization control signal to said quantizing means; said quantization control means, in the second quantization control, comparing said first code amount of said motion picture frame concerned with said reference code amount, generating the second quantization control signal such that, when the first code amount is larger than the reference code amount, a coarser quantization step than the first quantization step is generated and, when the first code amount is smaller than the reference code amount, a finer quantization step than the first quantization step is generated, and outputting said second quantization control signal to said quantizing means; comparing with the reference code amount each of said first code amount of said motion picture frame concerned and a second code amount corresponding to the second quantization control signal of the motion picture frame concerned; determining, as a final code amount, the code amount that is closer to said reference code amount; and outputting an output command signal for sending the series of codes having said final code amount to an external circuit as compression data; wherein if the frame period in which said motion picture frame concerned is received is denoted as a first frame period, the frame period of the thinned-out frame which follows said first frame period is denoted as a second frame period, and the frame period of a motion picture frame which follows said second frame period is denoted as a third frame period, accumulation of absolute values of alternating current components of transformation coefficients of a motion picture frame received in said first frame period is executed in said first frame period; and, transformation coefficients of the same motion picture frame being read two times from said frame memory means, the first reading as well as the quantization and variable length coding corresponding to the first quantization control signal, of the transformation coefficients read through the first reading are executed during said second frame period; and the second reading as well as the quantization and variable length coding corresponding to the second quantization control signal, of the transformation coefficients read through the second reading are executed during said third frame period.

5. The apparatus according to claim 4 comprising first and second buffer memory means and buffer memory control means, the buffer memory control means executing control during said second and third frame periods for writing to said first and second buffer memory means, respectively, the first and second series of codes, respectively, of a motion picture frame received during said first frame period; and in response to the output command signal sent from said quantization control means, executing read control of the buffer memory means storing the series of codes having the final code amount to cause said Series of codes to be read.

* * * * *